US012372305B2

(12) United States Patent
Pathrose Thresial et al.

(10) Patent No.: US 12,372,305 B2
(45) Date of Patent: Jul. 29, 2025

(54) SUPPORT PLATFORM ASSEMBLY

(71) Applicant: Saudi Arabian Oil Company, Dhahran (SA)

(72) Inventors: Salimkumar Pathrose Thresial, Udhailiyah (SA); Sultan Y. Jizan, Hufof (SA); Abdullah F. Doraia, Mubarraz (SA); Ali H. Sallman, Almassudieast (SA)

(73) Assignee: Saudi Arabian Oil Company, Dhahran (SA)

( * ) Notice: Subject to any disclaimer, the term of this patent is extended or adjusted under 35 U.S.C. 154(b) by 1034 days.

(21) Appl. No.: 17/444,103

(22) Filed: Jul. 30, 2021

(65) Prior Publication Data

US 2023/0036028 A1 Feb. 2, 2023

(51) Int. Cl.

| | |
|---|---|
| ***F28D 1/02*** | (2006.01) |
| ***B66F 1/02*** | (2006.01) |
| ***B66F 11/00*** | (2006.01) |
| ***F04D 29/64*** | (2006.01) |

(52) U.S. Cl.

CPC ................ *F28D 1/024* (2013.01); *B66F 1/02* (2013.01); *B66F 11/00* (2013.01); *F04D 29/646* (2013.01); *B66F 2700/025* (2013.01); *B66F 2700/04* (2013.01); *F28F 2250/08* (2013.01)

(58) Field of Classification Search

CPC .. F28D 1/024; B66F 1/02; B66F 11/00; B66F 2700/025; B66F 2700/04; F04D 29/646; F28F 2250/08

See application file for complete search history.

(56) References Cited

U.S. PATENT DOCUMENTS

| | | | | |
|---|---|---|---|---|
| 1,515,445 | A * | 11/1924 | Smith | B25B 27/023 29/261 |
| 1,870,711 | A | 8/1932 | Cooney | |
| 3,059,327 | A | 10/1962 | Burrows | |
| 4,235,004 | A | 11/1980 | Floyd | |
| 6,266,860 | B1 | 7/2001 | Kiebler | |
| 6,474,956 | B2 | 11/2002 | Davis et al. | |
| 8,931,156 | B1 | 1/2015 | Zimmer et al. | |
| 9,821,987 | B2 | 11/2017 | Vogel et al. | |
| 9,823,022 | B2 | 11/2017 | Rollins | |
| 2003/0024446 | A1 * | 2/2003 | Lanphear | A47B 9/20 108/147 |
| 2010/0317282 | A1 | 12/2010 | Okada et al. | |
| 2018/0280917 | A1 | 10/2018 | Victor et al. | |
| 2021/0088233 | A1 | 3/2021 | Kim et al. | |

FOREIGN PATENT DOCUMENTS

| | | | |
|---|---|---|---|
| CN | 202169560 U | * | 3/2012 |
| CN | 202853733 U | | 4/2013 |

OTHER PUBLICATIONS

Learn About Fin-Fan® Air Coolers; https://www.chartindustries.com/Energy/Air-Cooled-Heat-Exchangers/Fin-Fan-101.

* cited by examiner

*Primary Examiner* — Audrey B. Walter
(74) *Attorney, Agent, or Firm* — Leason Ellis LLP

(57) ABSTRACT

A pulley wheel support frame having a ring-shaped support rim having a top surface adapted to support a horizontal pulley wheel, said ring-shaped support rim being coupled, on a bottom side, to an opening adapted to receive a ram or a saddle of a jack; a base; and three or more height-adjustable support columns coupling the base to the ring-shaped support rim, said height-adjustable support columns each being fixable at a plurality of different heights.

9 Claims, 16 Drawing Sheets

SUPPORT PLATFORM ASSEMBLY

FIELD

The present invention generally relates to a platform assembly for supporting a heavy component during removal from and installation to an industrial-scale mechanism. More specifically, the present invention is directed to a pulley wheel support frame assembly having a platform adapted to support a horizontal pulley wheel during removal from a fin fan heat exchanger, the support frame assembly being adapted to raise and align the pulley wheel on the platform for installation to the fin fan heat exchanger.

BACKGROUND

Large scale heat exchangers have many applications especially for cooling fluids that are heated in an industrial process. For example, lubrication fluids used in large-scale machinery—such as gas turbines and the like—are often cooled via such heat exchangers. Fin fan heat exchangers are a common type of industrial scale heat exchangers that use large fans to circulate air through the heat exchanger to thereby provide air cooling to heated fluids that are piped through the heat exchanger in finned tubes for exposure to the air cooling.

FIG. 1 is a schematic sideview diagram of an industrial scale air cooling assembly 100 for use in a fin fan heat exchanger. As shown in FIG. 1, the air cooling assembly 100 comprises a fan 105 for circulating air towards air coolers 110, which in a fin fan heat exchanger can include finned tubes carrying fluids to be cooled (not shown). Fan 105 is driven by a motor 115. As illustrated in FIG. 1, motor 115 incorporates a belt driving wheel 117 for driving a belt 120, which in turn drives a pulley wheel 125 that is coupled to a drive shaft 130 of fan 105 via a coupling 135. Coupling 135 can be a taper bush coupling and the like. Given the large scale of fan 105, drive shaft 130 is typically supported by an upper block bearing 140 and a lower block bearing 145 for providing rotatable anchor points to surrounding support structures at respective upper and lower portions of drive shaft 130. With the fan 105 and drive shaft 130 adequately supported and stabilized, the belt pulley wheel 125 is coupled to the drive shaft 130 via taper bush coupling 135 to a lower end of the drive shaft 130 below the lower block bearing 145, as illustrated in FIG. 1, for driving fan 105.

Access to the components of assembly 100 for maintenance and repair is provided by a support platform 150 under assembly 100, as shown in FIG. 1. With motor 115 being separated from the fan assembly, servicing the motor 115 is, consequently, more convenient. However, with the support structure for fan 105 being effectively enclosed by the coupling 135 of the belt pulley wheel 125 to drive shaft 130, servicing any part of the fan assembly—such as maintaining, replacing, or repairing the upper and lower block bearings 140 and 145—would require the removal of the pulley wheel 125 from the drive shaft 130. In a typical industrial scale fin fan heat exchanger, pulley 125 has a diameter of approximately 2.5 feet and can weigh more than 50 kg.

As highlighted in FIG. 1, a height (155) of pulley wheel 125 from support platform 155 needs to align precisely with belt driver 117 of motor 115 for fan 105 to be driven properly and efficiently. However, height (155) can differ among fan assemblies depending upon the heat exchanger and driver (motor) arrangement and scale. Indeed, individual fan assemblies that otherwise generally conform to the structure of assembly 100 can have varying heights from a corresponding platform even within a same heat exchanger. Thus, removal and reinstallation of pulley wheel 125 to assembly 100 can present many difficulties given its weight and the need for a precise alignment to belt driver 117 on motor 115 during installation.

FIG. 2 is an illustration of a typical manner in which pulley wheel 125 is removed from assembly 100. As shown in FIG. 2, a technician 200 would lie prone on platform 150 under assembly 100 to remove and hold pulley wheel 125. Given the sizes and weights of the components, such typical manners of removing and replacing pulley wheel 125 can be dangerous to the technician—subjecting the technician to injury—and time consuming in view of the energy needed from the technician to remove pulley wheel 125 and to install the pulley wheel 125 to assembly 100, which would include precisely aligning pulley wheel 125 to height (155) for drive portion 117 of motor 115 when coupling pulley wheel 125 to drive shaft 130. As shown in FIG. 2, height (155) can be approximately 1.5 feet, or between about 1.25 to 2 feet, which provides very limited clearance for the aforementioned removal and replacement of pulley wheel 125.

SUMMARY

To overcome the above-noted challenges, it is an object of the present invention to provide a variable height adjustment support special tool consisting of two separable portions—a base portion and a platform portion for the purpose easy handling and shipment—that can support pulley wheel 125 of assembly 100 during removal and precise alignment installation.

The present invention generally relates to a platform assembly for raising and lowering a heavy component and, more specifically, an assembly for holding, lowering, and raising a pulley during maintenance of a fin fan in an air-cooled heat exchanger that involves the removal and installation/alignment of the pulley from/to the fin fan shaft.

According to an exemplary embodiment of the present invention, a special tool supports a pulley in position by a hydraulic jack, and lock nuts level the pulley to hold it in position, avoiding wobbling due to heavy weight and size. Advantageously, a technician would not be required to stay under the suspended load and assisting in holding the pulley, as shown in FIG. 2.

According to an exemplary embodiment of the present invention, a pulley wheel support frame, comprises: a ring-shaped support rim having a top surface adapted to support a horizontal pulley wheel, said ring-shaped support rim being coupled, on a bottom side, to an opening adapted to receive a ram or a saddle of a jack; a base; and three or more height-adjustable support columns coupling the base to the ring-shaped support rim, said height-adjustable support columns each being fixable at a plurality of different heights.

In accordance with an exemplary embodiment, the three or more height-adjustable support columns each comprise: a guiding pipe extending from a bottom portion of the ring-shaped support rim; a guide bar extending from a top portion of the base adapted for insertion into an internal channel at a bottom portion of the guiding pipe; and a stud coupled to the guide bar that abuts the bottom portion of the guiding pipe.

According to an embodiment, the stud is fixable to a plurality of different locations on the guide bar corresponding to the plurality of different heights.

According to an embodiment, the stud and the guide bar are coupled to each other by complementary threads.

According to an embodiment, the ring-shaped support rim is detachable from the base by withdrawing the guide bar from the internal channel of the guiding pipe in each of the three or more height-adjustable support columns.

In accordance with an exemplary embodiment of the invention, the opening is embodied in a central housing that is coupled to the ring-shaped support rim by a plurality of frame legs.

In accordance with an exemplary embodiment, the plurality of frame legs and the three or more height-adjustable support columns are attached to the ring-shaped support rim on the bottom side in an alternating circular arrangement.

According to an exemplary embodiment of the present invention, a total height from a bottom of the base to the top surface of the ring-shaped support rim is below 1.5 feet in a default configuration of the three or more height-adjustable support columns.

According to an exemplary embodiment of the present invention, the three or more height-adjustable support columns are fixable to a raised configuration with a total height from a bottom of the base to the top surface of the ring-shaped support rim at or above 1.5 feet.

BRIEF DESCRIPTION OF THE DRAWINGS

Various exemplary embodiments of this invention will be described in detail, with reference to the following figures, wherein.

DETAILED DESCRIPTION

Figure 1:
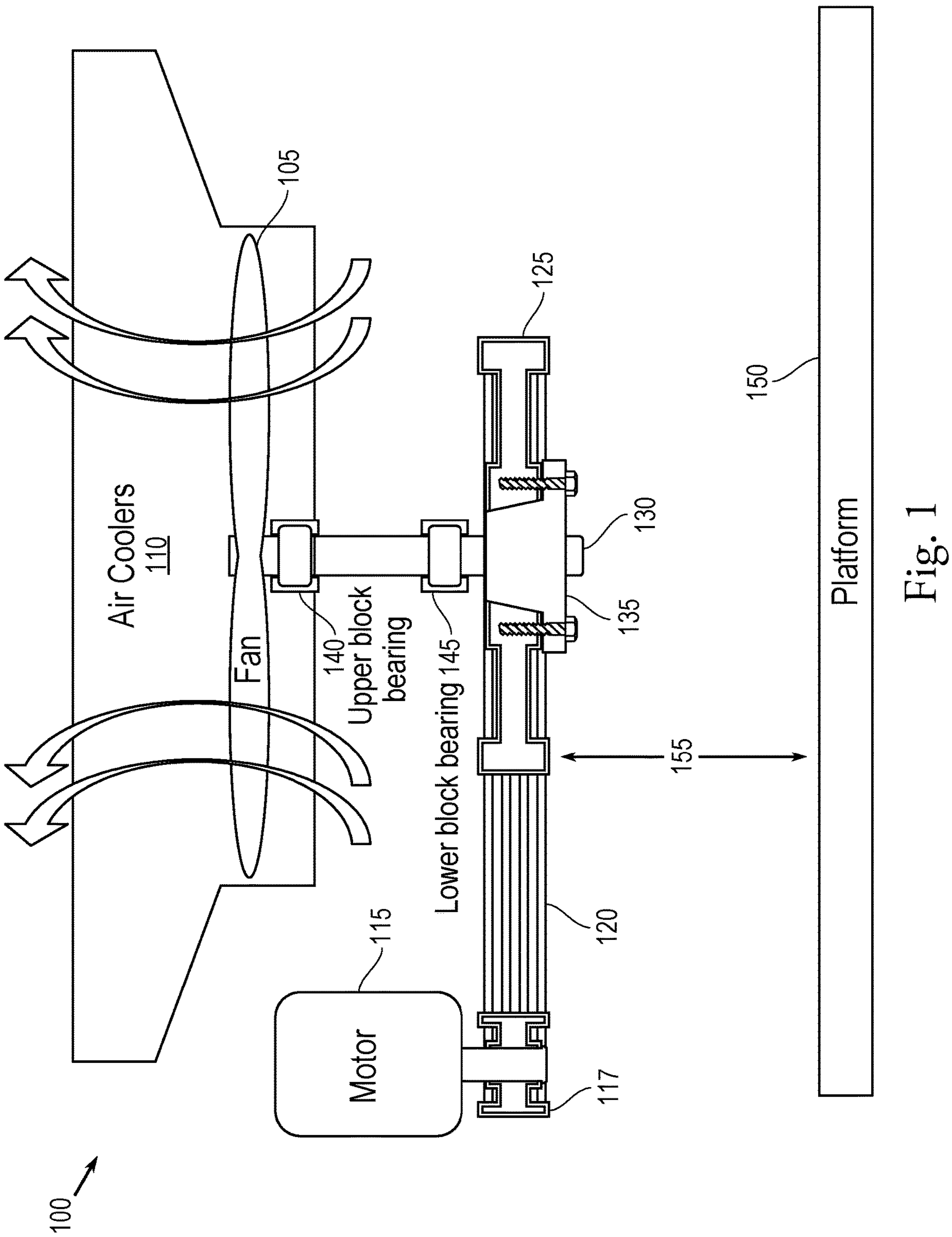
FIG. 1 is a schematic sideview diagram of an industrial scale air cooling assembly for use in a fin fan heat exchanger.
Figure 2:
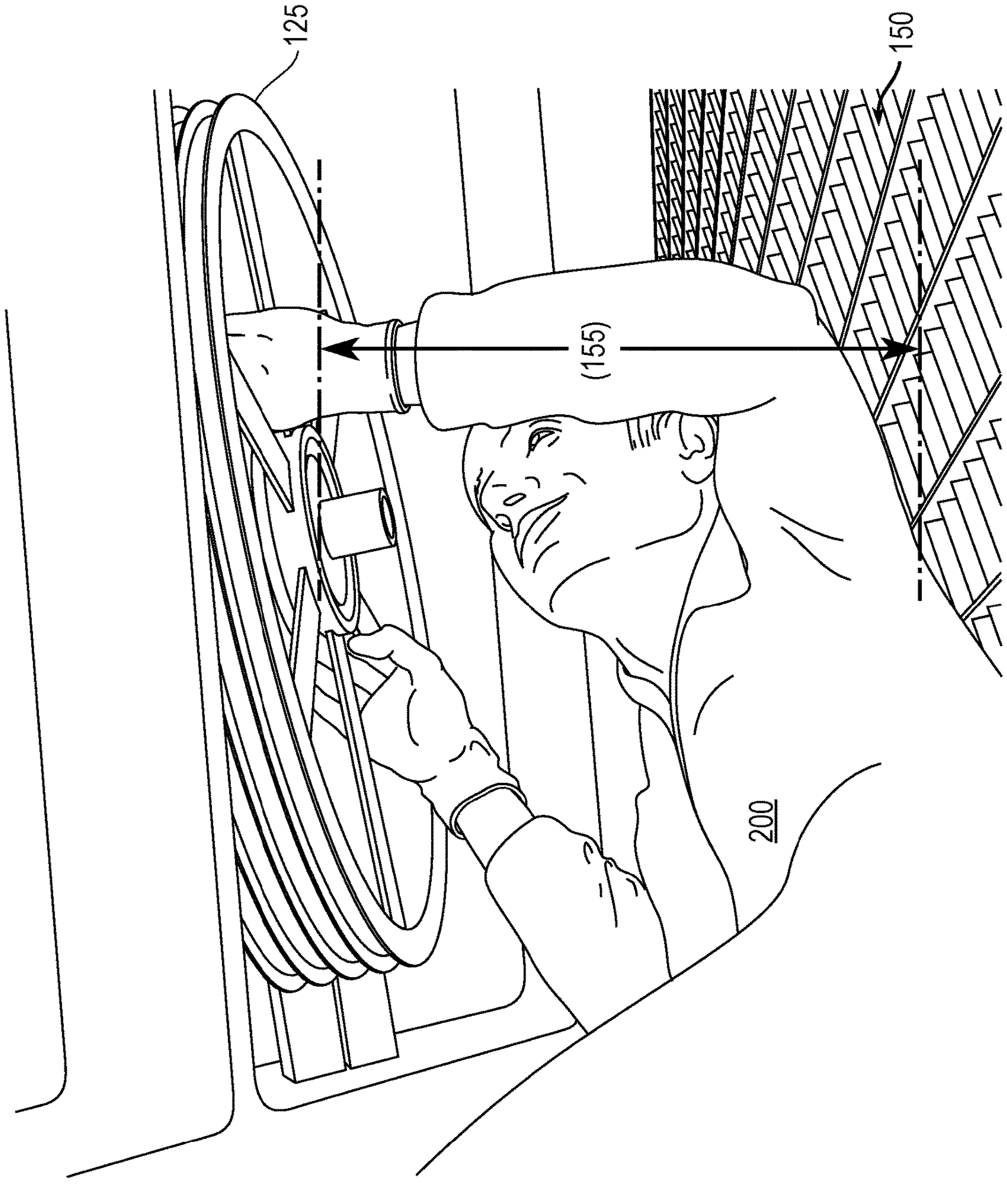
FIG. 2 is an illustration of a typical manner in which a pulley wheel is removed from and installed to the assembly shown in FIG. 1.

The present invention is directed to a platform assembly for supporting a heavy component during removal from and installation to an industrial-scale mechanism and, more specifically, to a pulley wheel support frame assembly having a platform adapted to support a horizontal pulley wheel during removal from a fin fan heat exchanger, the support frame assembly being adapted to raise and align the pulley wheel on the platform for installation to the fin fan heat exchanger.

The headings used herein are for organizational purposes only and are not meant to be used to limit the scope of the description or the claims. As used throughout this application, the words “may” and “can” are used in a permissive sense (i.e., meaning having the potential to), rather than the mandatory sense (i.e., meaning must). Similarly, the words “include,” “including,” and “includes” mean including but not limited to. To facilitate understanding, like reference numerals have been used, where possible, to designate like elements common to the figures.

Figure 3A:
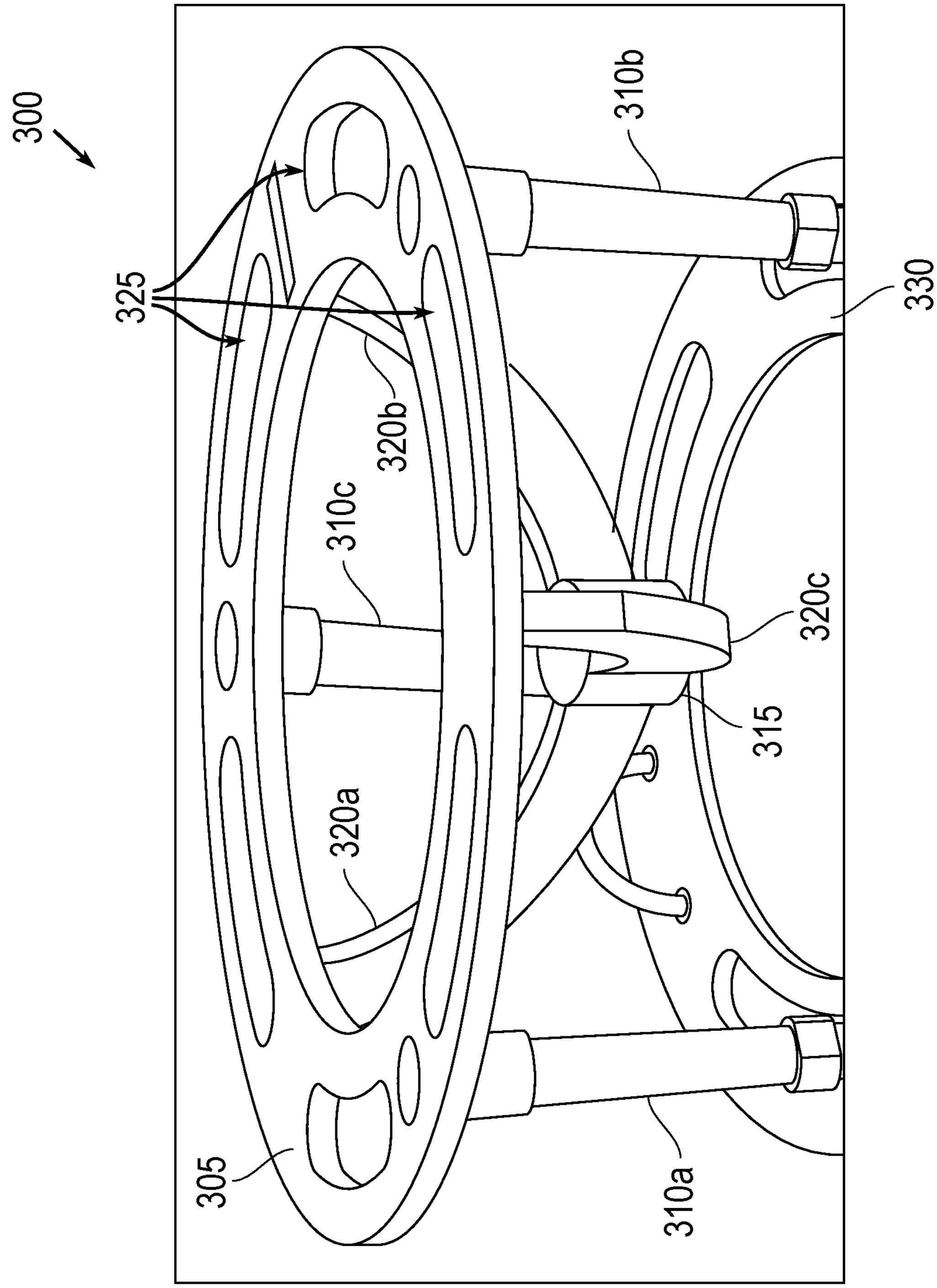
FIG. 3A is an illustration of a support frame assembly in accordance with an exemplary embodiment of the present invention.

FIG. 3A is an illustration of a support frame assembly 300 in accordance with an exemplary embodiment of the present invention. As shown in FIG. 3A, support frame assembly 300 comprises a platform 305, which can be in a ring shape and dimensioned to provide a flat top surface to fit a corresponding recess between a middle hole and an outer rim of pulley wheel 125 to thereby form a “pulley holding rim” or a “ring-shaped support rim”—to hold and support, for example, spokes on pulley wheel 125. Platform 305 is supported by at least three (3) guiding pipes 310*a*, 310*b*, and 310*c* that are fastened to, or integrated with, an underside of platform 305 in an evenly spaced manner around a circumference of platform 305. As will be described in further detail below, guiding pipes 310*a-c* each incorporate an internal channel that is open on the bottom side (not shown) for receiving a respective height adjustment guide bar (340*a-c* in FIG. 3C) from a base portion 330 of the support frame assembly 300. Additionally, platform 305 is coupled to a central housing 315 that incorporates an opening on its underside (or bottom side) (see 317 in FIG. 3B) adapted to receive a jack, such as a hydraulic jack and the like, as described in further detail below. As illustrated in FIG. 3A, central housing 315—of which the underside opening (not shown) may be lined with a "center bush" (not shown) to form a fitted opening to receive a ram (or a saddle) of a jack—is coupled to platform 305 via at least three (3) frame legs 320*a*, 320*b*, and 320*c* that are fastened to, or integrated with, an underside of platform 305 in an evenly spaced manner around a circumference of platform 305. As further illustrated in FIG. 3A, guiding pipes 310*a*, 310*b*, and 310*c* alternate with frame legs 320*a*, 320*b*, and 320*c* in a circular arrangement around a circumference of platform 350 in an evenly spaced manner. Thus, each of guiding pipes 310*a*, 310*b*, and 310*c* can be approximately 60° from their respective adjacent frame legs 320*a*, 320*b*, and 320*c*, and vice versa. Consequently, guiding pipes 310*a*, 310*b*, and 310*c* and frame legs 320*a*, 320*b*, and 320*c* collectively provide even support to platform 305 for holding pulley wheel 125 as will be described in further detail below. Support elements 310*a-c* and 320*a-c* may be fastened to or integrated with, by welding and the like, platform 305 to form an integrated unit that is attachable to and detachable from the base portion (330) of assembly 300 as described in further detail below. According to an exemplary embodiment, platform 305 incorporates one or more apertures 325 to account for any protrusions on a bottom surface of pulley wheel 125 so that any such protrusions can be accommodated through the one or more apertures 325 while maintaining pulley wheel 125 in a generally horizontal orientation with balanced support. According to an exemplary embodiment, support frame assembly 300 is composed of a metallic composite material that is sufficiently strong and rigid to support a heavy industrial component, such as a fin fan pulley wheel, as described in further detail below.

Figure 3B:
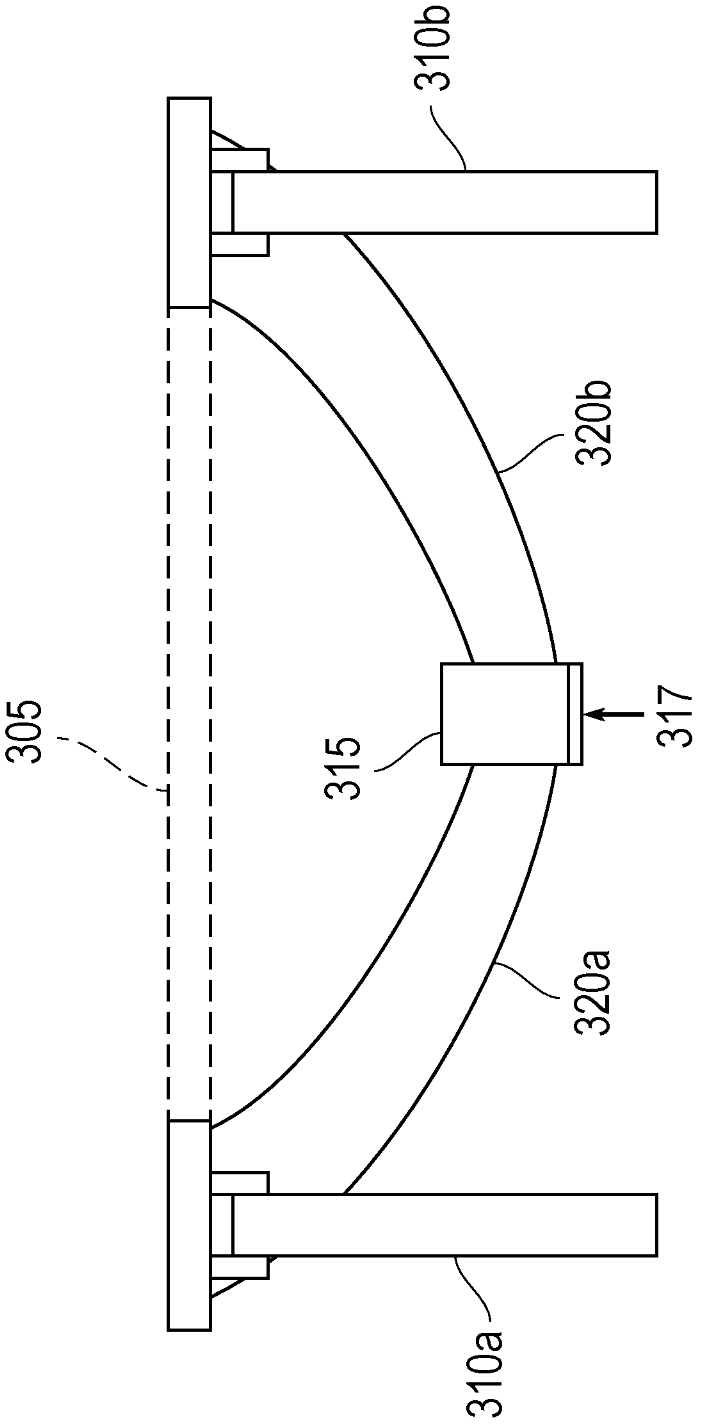
FIG. 3B is a schematic sideview diagram of the platform portion disassembled from the support frame assembly shown in FIG. 3A.

FIG. 3B is a schematic sideview diagram of the platform portion 305 disassembled from the support frame assembly 300 shown in FIG. 3A. For ease of illustration, guiding pipes 310*a* and 310*b* are shown in FIG. 3B fastened to the underside of platform 305 at two opposing sides of platform portion 305 and guiding pipe 310*c* is omitted from the illustration in FIG. 3B. Correspondingly, frame legs 320*a* and 320*b* are also shown in FIG. 3B fastened to the underside of platform 305 at two opposing sides of platform portion 305 and frame leg 320*c* is also omitted from the illustration in FIG. 3B. It should be readily understood by one of ordinary skill in the art that the schematic view of FIG. 3B merely provides a representation of platform 305 for showing its relationship with the remainder of assembly 300, especially during use with air cooling assembly 100 described in further detail below with reference to FIGS. 4-12. Thus, the placements and relationships among guiding pipes 310*a*, 310*b*, and 310*c* and frame legs 320*a*, 320*b*, and 320*c* are not precisely shown in the schematic views of FIGS. 3B and 4-12 and it should be readily understood by one of ordinary skill in the art that, according to an exemplary embodiment of the present invention, they generally conform to the equidistance and alternating arrangement illustrated in FIG. 3A. It is further noted that these support elements (310*a-c* and 320*a-c*) can have alternative arrangements for providing balanced support to platform portion 305 without departing from the scope of the present invention.

Figure 3C:
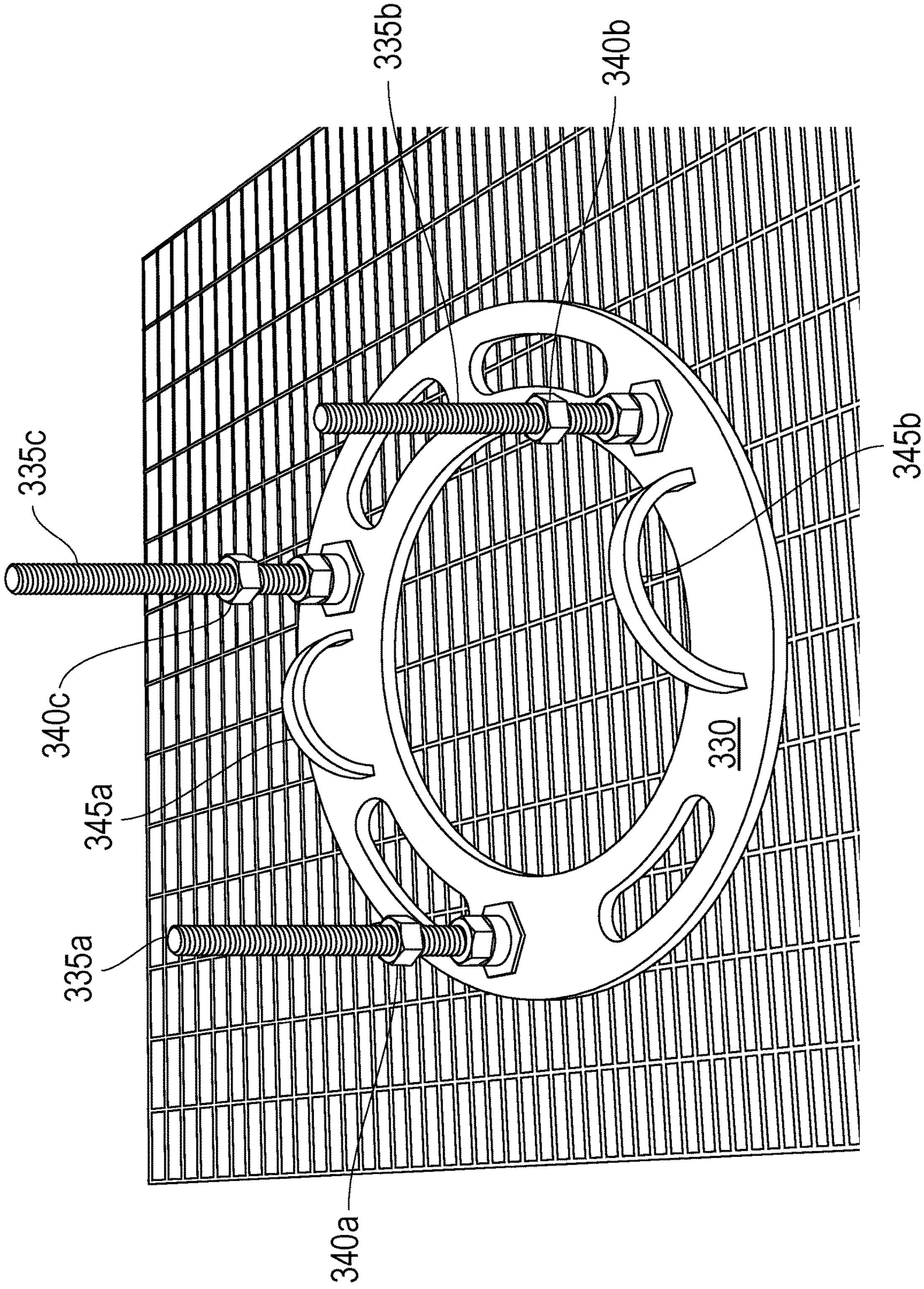
FIG. 3C is an illustration of the base portion, in disassembled form, of the support frame assembly shown in FIG. 3A.

FIG. 3C is an illustration of the base portion 330, in disassembled form, of the support frame assembly 300 shown in FIG. 3A. As illustrated in FIGS. 3A and 3C, support frame assembly 300 includes a ring-shaped base plate (or "basement plate") 330 coupled to at least three (3) height adjustment guide bars 335*a*, 335*b*, and 335*c* that are arranged around the top side of base plate 330 at positions corresponding to guiding pipes 310*a*, 310*b*, and 310*c*, respectively, on the bottom side of platform portion 305. In other words, guide bars 335*a-c* are evenly spaced around a circumference of base plate 330. According to an exemplary embodiment, guide bars 335*a-c* are threaded cylindrical columns with diameters that are slightly smaller than the internal diameters of guiding pipes 310*a-c* (internal channels) so that guide bars 335*a-c* can be inserted into (the internal channels of) guiding pipes 310*a-c* for a stable fit between platform 305 and base plate 330, as shown in FIG. 3A. As further illustrated in FIG. 3C, each of guide bars 335*a-c* includes a respective height adjustment stud 340*a-c* with a complementary thread to the thread on the guide bars 335*a-c*. Accordingly, studs 340*a-c* can be placed at any height on guide bars 335*a-c* by rotating them along the respective guide bars 335*a-c* in a manner similar to threaded nuts and bolts. Studs 340*a-c* are dimensioned to exceed the internal diameters of (the internal channels of) guiding pipes 310*a-c* so as to abut the bottom portions (e.g., edges) of guiding pipes 310*a-c*, thereby holding up platform 305. Advantageously, platform 305 can be set to different heights by adjusting the heights of studs 340*a-c* along guide bars 335*a-c*. Thus, guiding pipes 310*a-c*, guide bars 335*a-c*, and studs 340*a-c* collectively form at least three (3) respective height-adjustable support columns for platform portion 305 when support frame assembly 300 is in an assembled form.

As shown in FIG. 3C, base plate 330 is in a ring shape and further incorporates handles 345*a* and 345*b* on opposite sides of a top surface thereof. Handles 345*a* and 345*b* provide for ease of handling of base plate 330 and, correspondingly, support frame assembly 300 when assembled. According to an exemplary embodiment, base plate 330 can be dimensioned to be the same size as or larger than platform 305 to ensure a stable support. Advantageously, the ring shapes of platform 305 and base plate 330 provide stable support while reducing the metallic material—and thus, reducing the weight—of support frame assembly 300, which contributes to the ease of its handling.

Figure 3D:
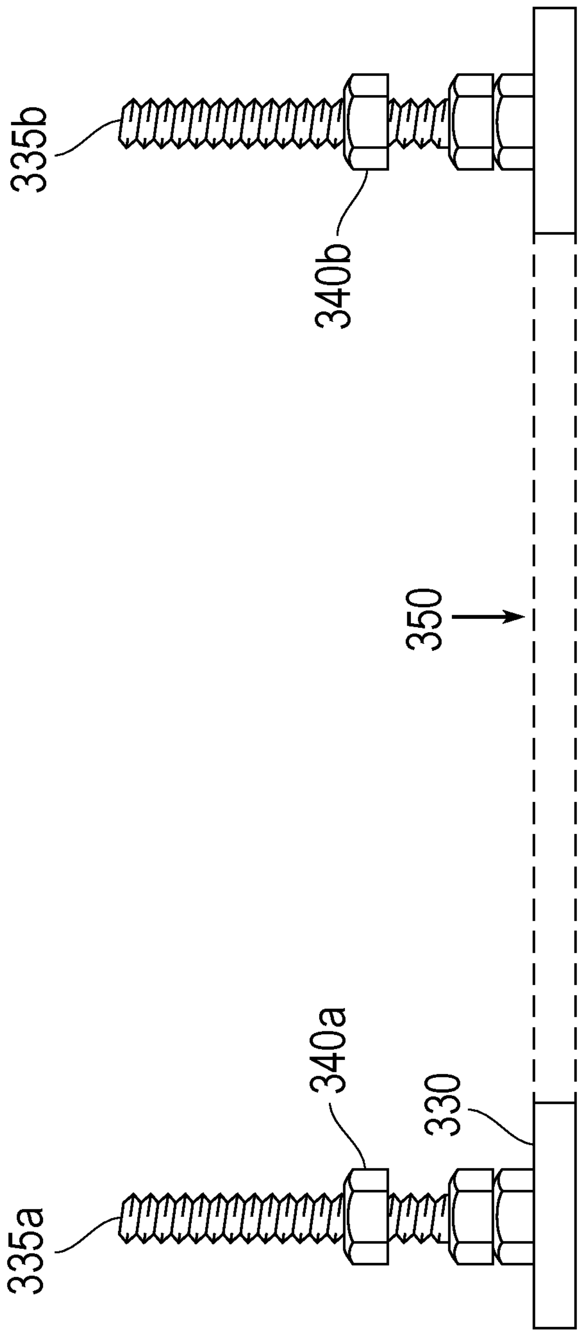
FIG. 3D is a schematic sideview diagram of the base portion shown in FIG. 3C.

FIG. 3D is a schematic sideview diagram of the base portion shown in FIG. 3C. In correspondence with FIG. 3B and for ease of illustration, guide bars 335*a* and 335*b*, along with studs 340*a* and 340*b*, are shown in FIG. 3D fastened to the topside of base plate 330 at two opposing sides of base plate 330 and guide bar 335*c*, along with stud 340*c*, are omitted from the illustration in FIG. 3D. It should be readily understood by one of ordinary skill in the art that the schematic view of FIG. 3D merely provides a representation of base plate 330 for showing its relationship with the remainder of assembly 300, especially during use with air cooling assembly 100 described in further detail below with reference to FIGS. 4-12. Thus, the placements and relationships among guide bars 335*a*, 335*b*, and 335*c* are not precisely shown in the schematic views of FIGS. 3D and 4-12 and it should be readily understood by one of ordinary skill in the art that, according to an exemplary embodiment of the present invention, they generally conform to the equidistance arrangement illustrated in FIG. 3C.

Figure 4:
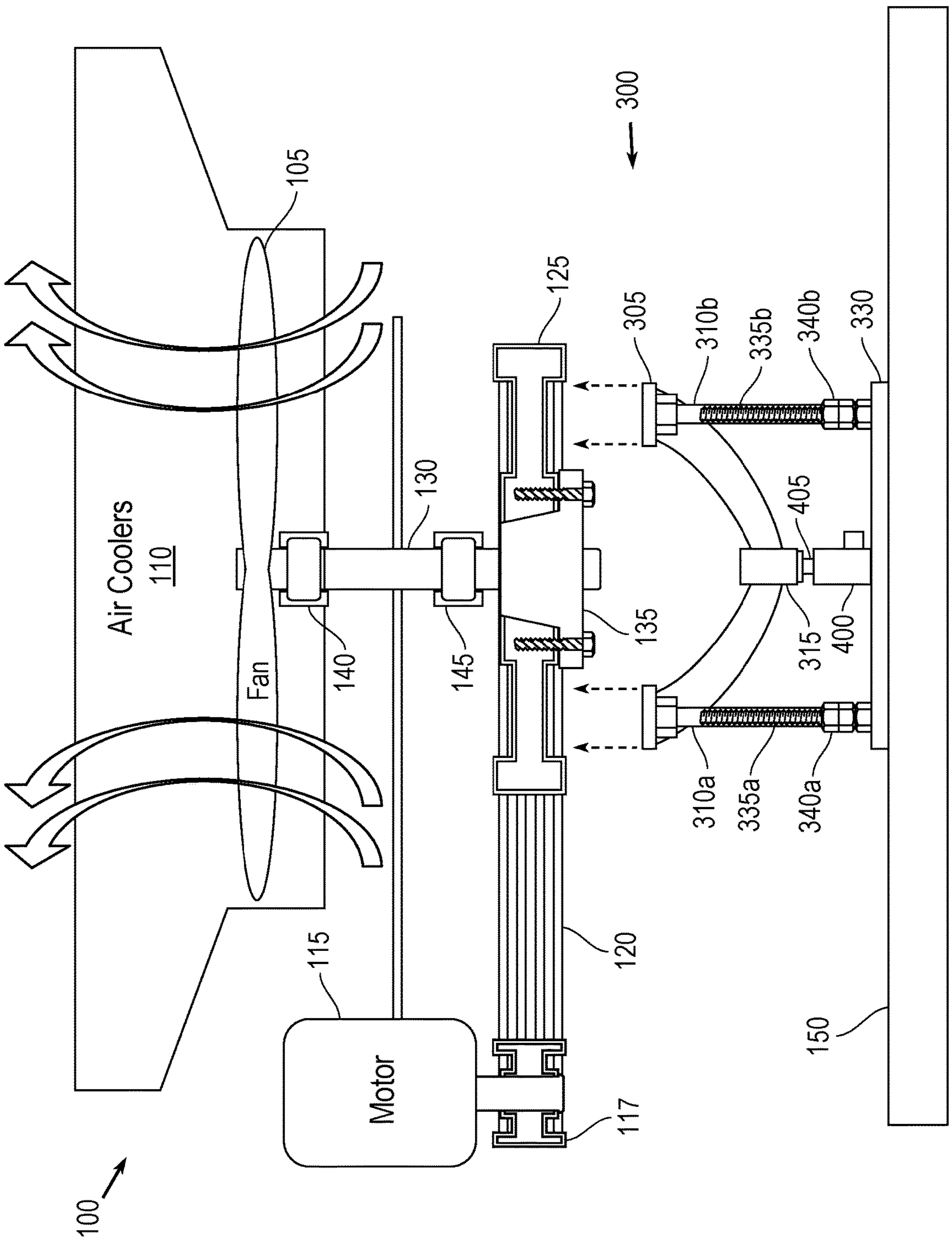
FIG. 4 is a schematic sideview diagram of the support frame assembly illustrated in FIGS. 3A-3D in assembled form and placed under the air cooling assembly on the platform shown in FIG. 1 in preparation for removal of the pulley wheel in the air cooling assembly in accordance with an exemplary embodiment of the present invention.

FIG. 4 is a schematic sideview diagram of the support frame assembly 300 illustrated in FIGS. 3A-3D in assembled form and placed under the air cooling assembly 100 on the platform shown in FIG. 1 in preparation for removal of the pulley wheel 125 in the air cooling assembly 100 in accordance with an exemplary embodiment of the present invention. As shown in FIG. 4, support frame assembly 300 can be placed on platform 150 in under and in alignment (see broken line arrows in FIG. 4) with pulley wheel 125. As shown in FIG. 4, the height of platform portion 305 from base plate 330 is less than the clearance between pulley wheel 125 and platform 150 (e.g., 1.5 feet) when support frame assembly 300 is in a default configuration where studs 340*a-c* are placed at respective bottom portions of guide bars 335*a-c*. According to an exemplary embodiment of the invention, the total height of support frame assembly 300—from the top of platform portion 305 to the bottom of base plate 330—is approximately 1 foot in the default configuration shown in FIG. 4 to provide for insertion under pulley wheel 125 at various clearance heights on platform 150. As further illustrated in FIG. 4, a jack 400 is placed under central housing 315 so that a ram (or saddle) 405 of the jack 400 is in alignment with the bottom bushed opening (317 in FIG. 3B) of central housing 315. As described above, jack 400 can be a hydraulic jack and the like that is suitable for lifting and holding heavy weights.

Figure 5:
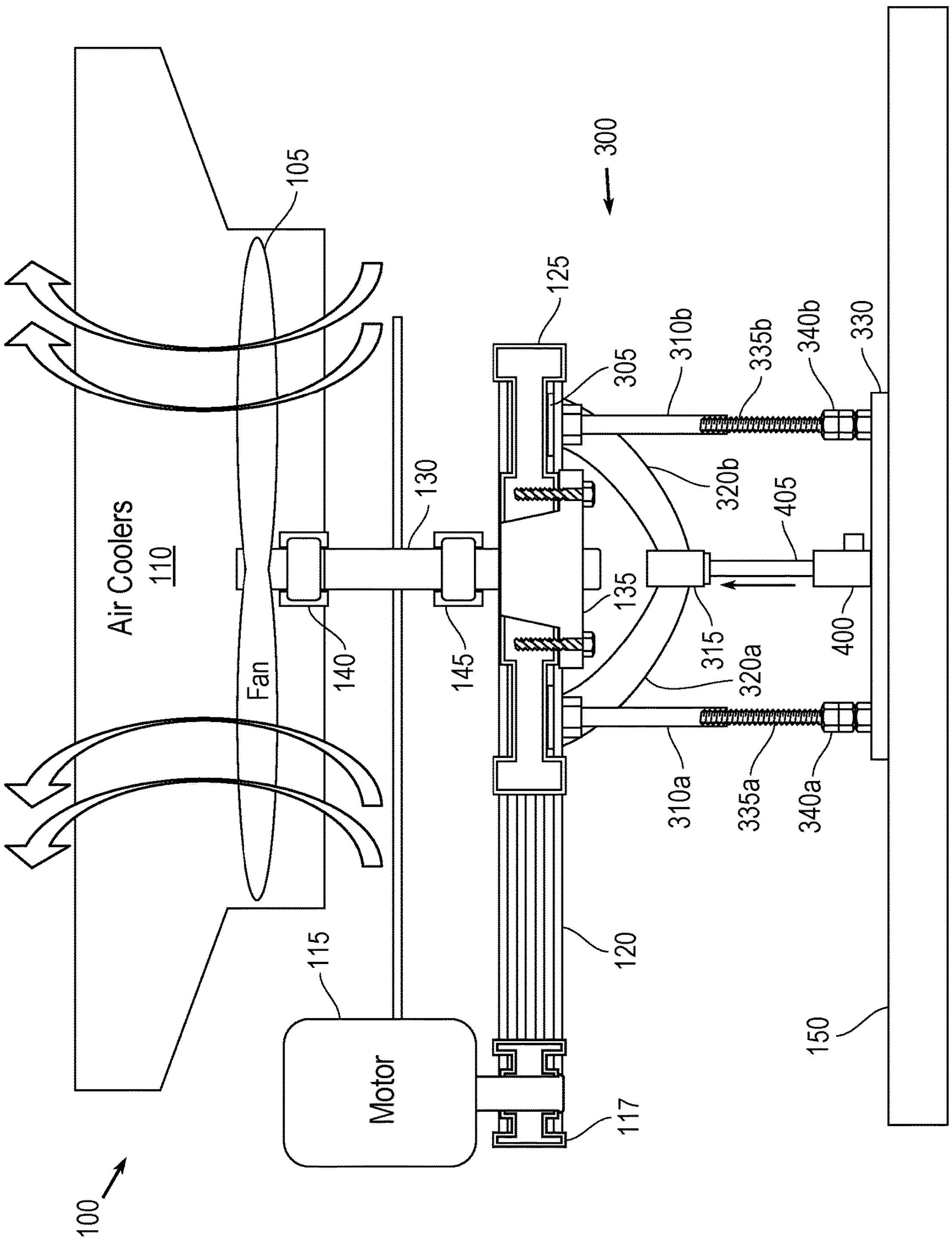
FIG. 5 is a schematic sideview diagram of the support frame assembly shown in FIG. 4 with the platform portion thereof being raised by a hydraulic jack to a height of the pulley wheel in the air cooling assembly according to an exemplary embodiment of the invention.

FIG. 5 is a schematic sideview diagram of the support frame assembly 300 shown in FIG. 4 with the platform portion 305 thereof being raised by a hydraulic jack 400 to a height of the pulley wheel 125 in the air cooling assembly 100 according to an exemplary embodiment of the invention. As shown in FIG. 5, as hydraulic jack 400 is activated and ram/saddle 405 is extended upward (see upward arrow adjacent ram/saddle 405 in FIG. 5), central housing 315 is pushed upward so that platform 305 coupled thereto via frame legs 320*a-c* is raised up to abut and support pulley wheel 125. According to an exemplary embodiment, platform portion 305 incorporate a ring shape with a flat top surface in order to provide a stable support surface to, say, the spokes (not shown) on pulley wheel 125. Thus, in the extended (or raised) configuration shown in FIG. 5, the total height of support frame assembly 300—from the top of platform portion 305 to the bottom of base plate 330—is approximately 1.5 feet, or between about 1.25 to 2 feet, in correspondence with height 155 for abutting a bottom surface on pulley wheel 125—for example, a bottom surface of the spokes (not shown) on pulley wheel 125. In embodiments, support frame assembly 300 can have different default and extended (raised) heights to accommodate different clearances corresponding to height 155.

Figure 6:
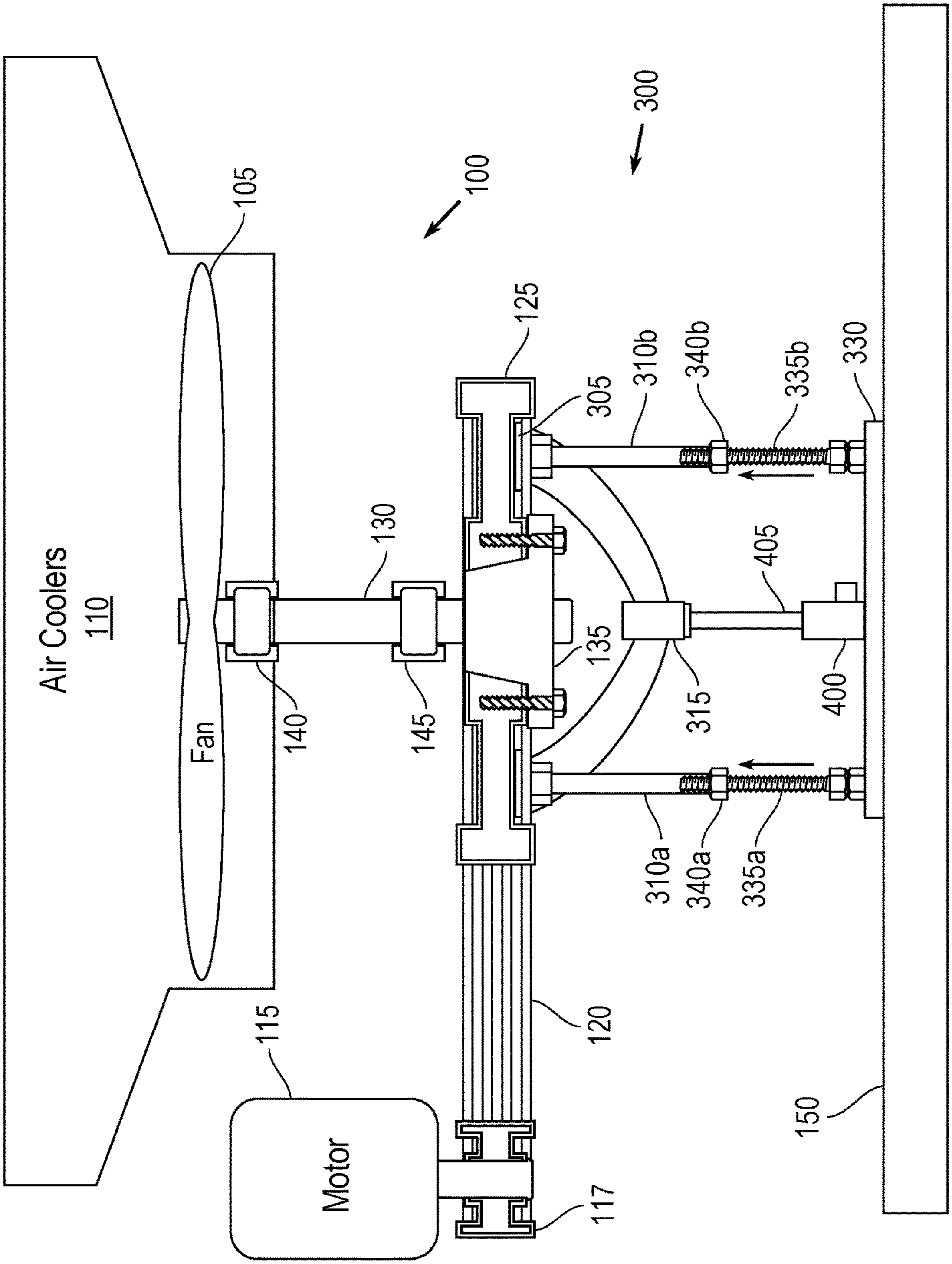
FIG. 6 is a schematic sideview diagram of the support frame assembly with height fixing nuts being raised to support the platform portion thereof at the height set as shown in FIG. 5 according to an exemplary embodiment of the invention.

Next, FIG. 6 is a schematic sideview diagram of the support frame assembly 300 with height adjustment studs (or height fixing nuts) 340*a-c* being raised to support the platform portion 305 thereof at the height set as shown in FIG. 5 according to an exemplary embodiment of the invention. With platform portion 305 raised to abut pulley wheel 125, jack 400 can be engaged to maintain the set height while studs/nuts 340*a-c* are rotated upward (see upward arrows adjacent studs/nuts 340*a* and 340*b* in FIG. 6) to abut the bottom edges of respective guiding pipes 310*a-c* that extend downward from platform portion 305. Once raised, studs/nuts 340*a-c* (in the raised configuration) provide added stable support to platform portion 305 while being fixed at the set height and, as a result, platform portion 305 provides stable, full weight support in holding and maintaining pulley wheel 125 at the set height.

Figure 7:
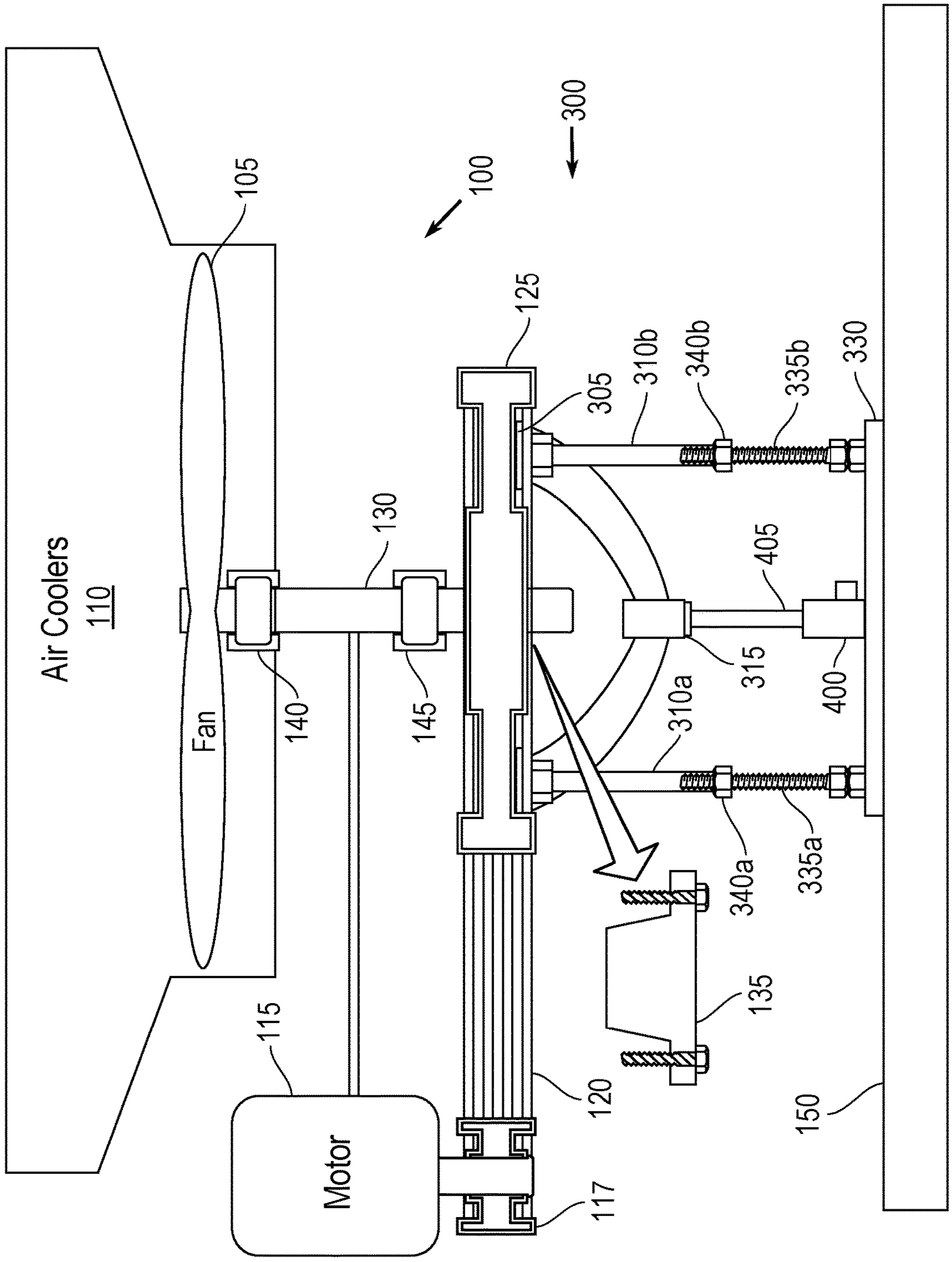
FIG. 7 is a schematic sideview diagram illustrating the removal of a coupling for the pulley wheel to the drive shaft of the fan in the air cooling assembly, with the pulley wheel being supported and maintained by the support frame assembly set in the manner shown in FIG. 6.

FIG. 7 is a schematic sideview diagram illustrating the removal of a coupling 135 for the pulley wheel 125 to the drive shaft 130 of the fan 105 in the air cooling assembly 100, with the pulley wheel 125 being supported and maintained by the support frame assembly 100 set in the manner shown in FIG. 6. As shown in FIG. 7, with pulley wheel 125 fully supported by platform 305 via guiding pipes 310*a-c* and studs/nuts 340*a-c*, along with central housing 315 and jack 400, coupling 135 can be removed from air cool assembly 100 (see outward arrow adjacent coupling 135 in FIG. 7) to thereby detach pulley wheel 125 from drive shaft 130. Advantageously, pulley wheel 125 is maintained in position while coupling 135 is removed, which substantially improves stability and safety.

Figure 8:
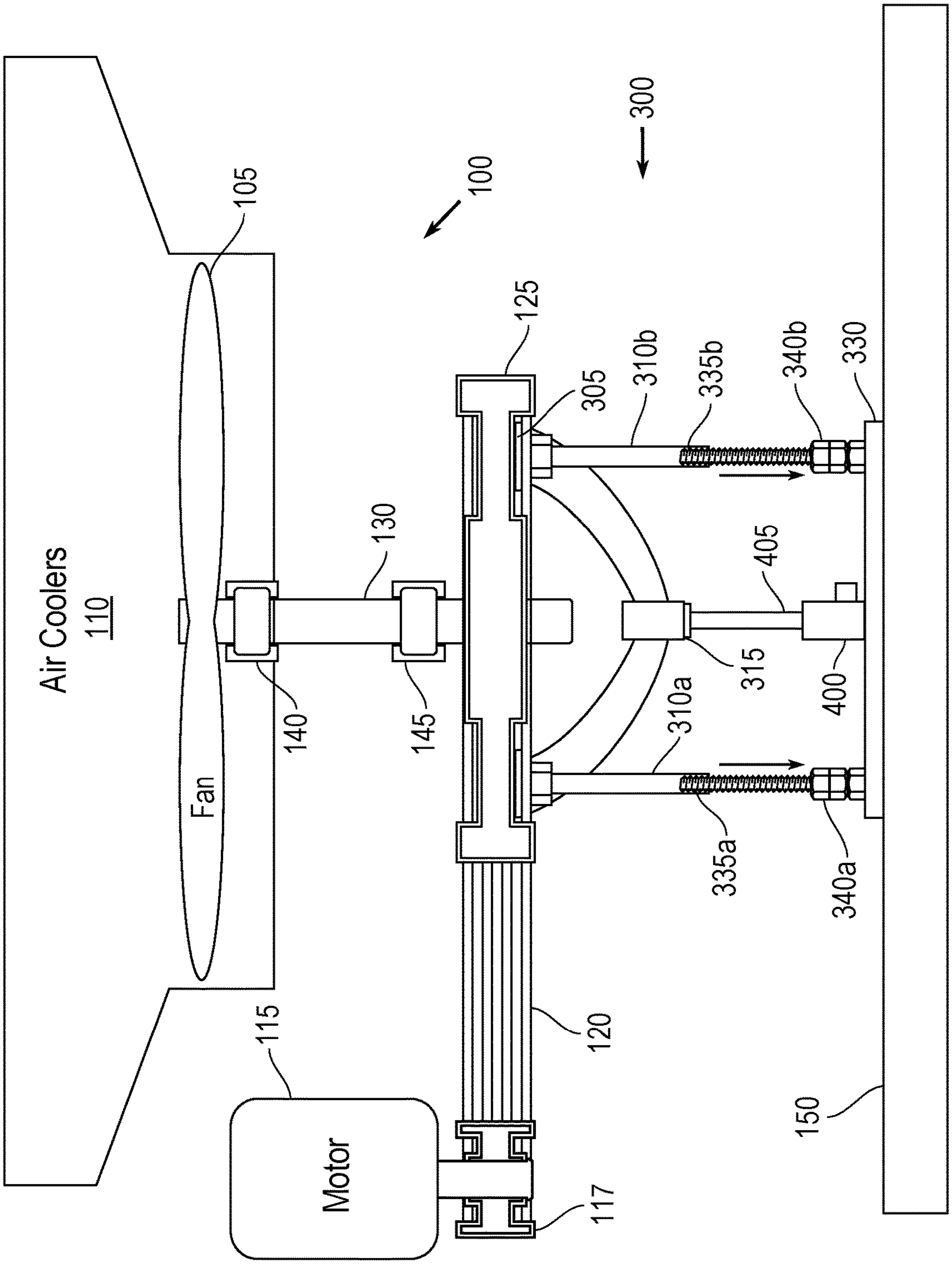
FIG. 8 is a schematic sideview diagram of the support frame assembly with the height fixing nuts being lowered while the platform portion thereof and the pulley wheel are held up by the hydraulic jack in accordance with an exemplary embodiment of the invention.

Next, FIG. 8 is a schematic sideview diagram of the support frame assembly 300 with the height fixing nuts 340*a-c* being lowered while the platform portion 305 thereof and the pulley wheel 125 are held up by the hydraulic jack 400 in accordance with an exemplary embodiment of the invention. As illustrated in FIG. 8, with pulley wheel 125 settled onto platform portion 305 of the support frame assembly 300, studs/nuts 340*a-c* can be lowered (see downward arrows adjacent studs/nuts 340*a* and 340*b* in FIG. 8) while jack 400 remains engaged to maintain platform portion 305 at the set height via ram/saddle 405 in the extended state. Additionally, belt 120 can be removed from drive wheel 117 of motor 115 and from pulley wheel 125 to fully disengage pulley wheel 125 from air cool assembly 100, as shown in FIG. 9.

Figure 9:
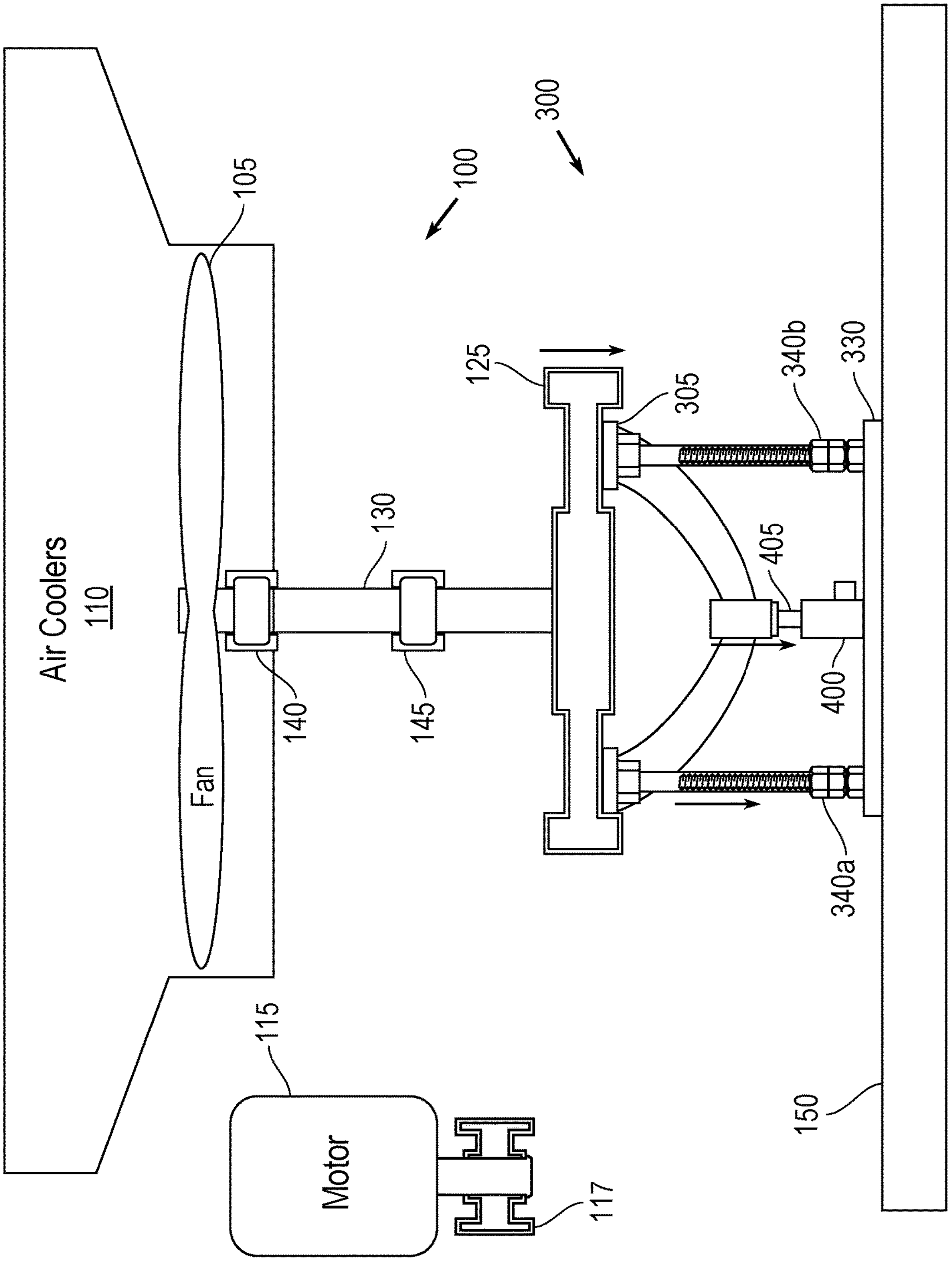
FIG. 9 is a schematic sideview diagram showing the belt between the pulley wheel and the drive interface of the motor having been removed and the hydraulic jack being released to lower the platform portion of the support frame assembly together with the pulley wheel away from the drive shaft of the air cooling assembly in accordance with an exemplary embodiment of the invention.

FIG. 9 is a schematic sideview diagram showing the belt 120 between the pulley wheel 125 and the drive interface/wheel 117 of the motor 115 having been removed and the hydraulic jack 400 being released to lower the platform portion 305 of the support frame assembly 300 together with the pulley wheel 125 away from the drive shaft 130 of the air cooling assembly 100 in accordance with an exemplary embodiment of the invention. As shown in FIG. 9, jack 400 can be disengaged and, as ram/saddle 405 is gradually compressed by the weight of pulley wheel 125 (see downward arrow adjacent ram/saddle 405 in FIG. 9), platform portion 305 can be lowered gradually along with pulley wheel 125 away from drive shaft 130 of air cool assembly 100. As a result, service can be conducted on air cool assembly 100—for example, fan 105, drive shaft 130, upper bearing block 140, and/or lower bearing block 145—without any obstruction from pulley wheel 125. Additionally, pulley wheel 125 is maintained on platform 305 in a stable position such that, optionally, support frame assembly 300 can be slid along platform 150 away from the position shown in FIG. 9 to provide additional room for performing service to air cool assembly 100. Alternatively, pulley wheel 125 itself can be repaired or replaced in the manner described herein.

Once service to air cool assembly 100 is completed, pulley wheel 125 can be installed thereto in the manner described below.

Figure 10:
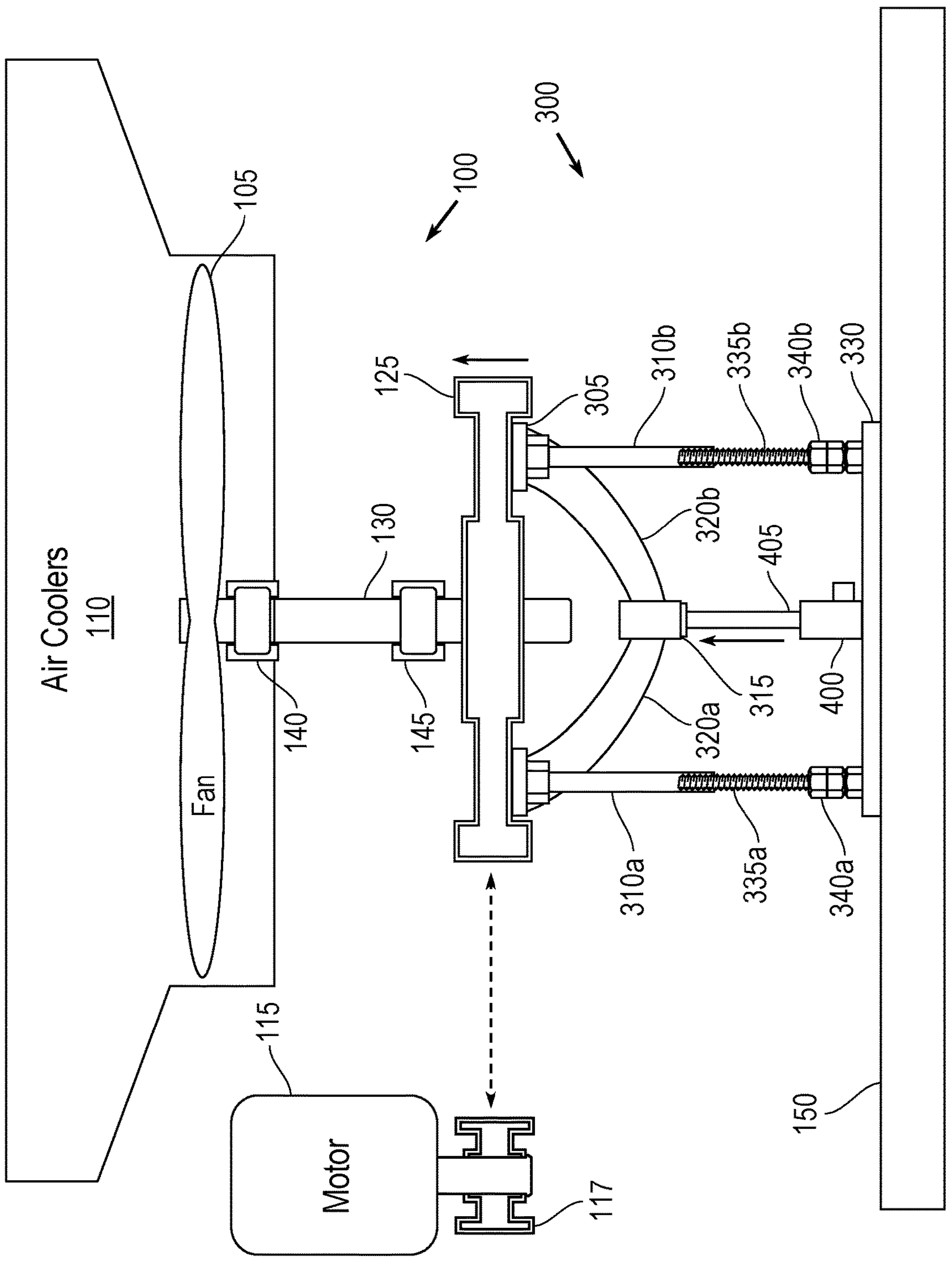
FIG. 10 is a schematic sideview diagram illustrating the platform portion of the support frame assembly being raised by the hydraulic jack to raise the pulley wheel to the drive shaft of the air cooling assembly in alignment with the drive interface of the motor according to an exemplary embodiment of the invention.

FIG. 10 is a schematic sideview diagram illustrating the platform portion 305 of the support frame assembly 300 being raised by the hydraulic jack 400 to raise the pulley wheel 125 to the drive shaft 130 of the air cooling assembly 100 in alignment with the drive interface/wheel 117 of the motor 115 according to an exemplary embodiment of the invention. As illustrated in FIG. 10, jack 400 is reengaged and ram/saddle 405 is extended upward again (see upward arrow adjacent ram/saddle 405 in FIG. 10). Correspondingly, platform portion 305 is raised by ram/saddle 405 via central housing 315 and frame legs 320*a-c* (see upward arrow adjacent pulley wheel 125 in FIG. 10). Advantageously, pulley wheel 125 can be aligned with drive wheel 117 of motor 115 stably and accurately (see broken line two-ended arrow between pulley wheel 125 and drive wheel 117 in FIGS. 10 and 11) by adjusting jack 400 and the height of ram/saddle 405.

Figure 11:
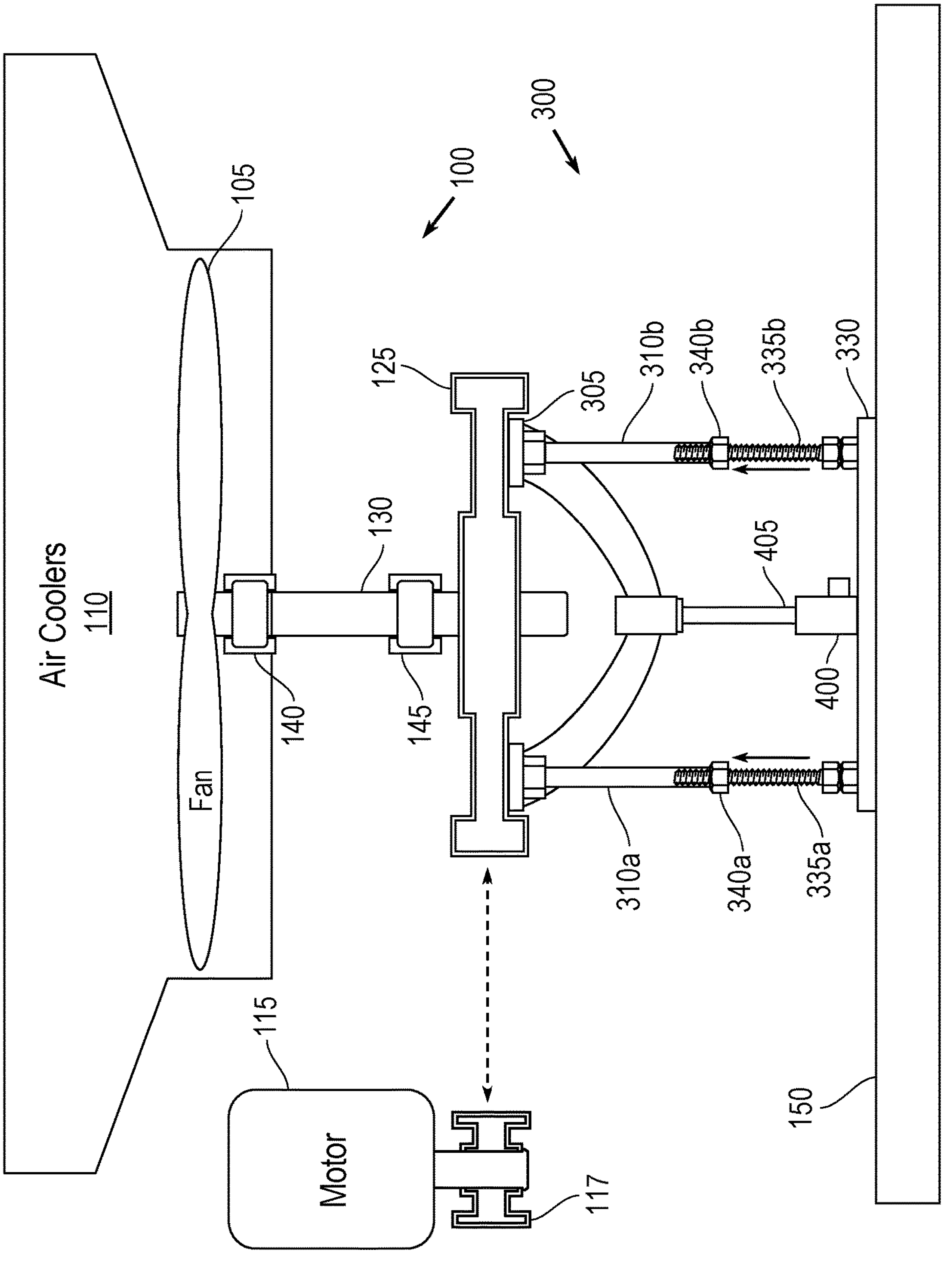
FIG. 11 is a schematic sideview diagram showing, with the pulley wheel in alignment with the drive interface of the motor, the height fixing nuts of the support frame assembly being raised to fix the height of the platform portion thereof according to an exemplary embodiment of the invention.

FIG. 11 is a schematic sideview diagram showing, with the pulley wheel 125 in alignment with the drive interface/wheel 117 of the motor 115, the height fixing nuts 340*a-c* of the support frame assembly 300 being raised to fix the height of the platform portion 305 thereof according to an exemplary embodiment of the invention. As shown in FIG. 11, studs/nuts 340*a-c* can be raised (see upward arrows adjacent studs/nuts 340*a* and 340*b* in FIG. 11) to heights on guide bars 335*a-c* that correspond to an alignment height for pulley wheel 125 (see broken line two-ended arrow between pulley wheel 125 and drive wheel 117 in FIGS. 10 and 11). As an example, jack 400 and studs/nuts 340*a-c* can be raised to previously-set alignment heights (studs/nuts 340*a-c* on guide bars 335*a-c*)—say, temporarily marked according to the heights in FIGS. 6 and 7. Alternatively, jack 400 can raise platform 305 to a height that is slightly higher than the alignment height and studs/nuts 340*a-c* can be raised to the previously-set alignment heights on guide bars 335*a-c* to, thereafter, adjust jack 400 back down to the alignment height with precision.

Figure 12:
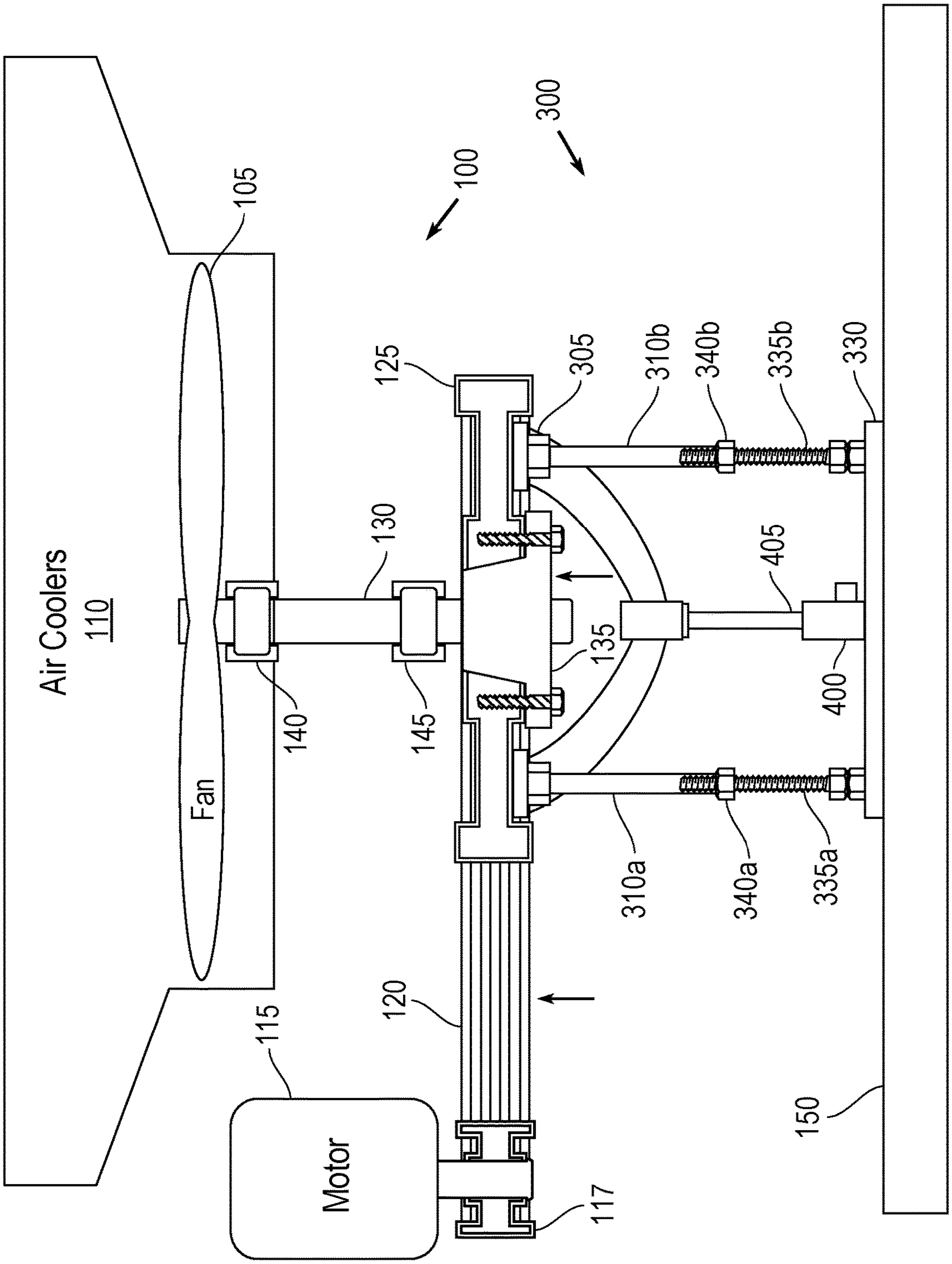
FIG. 12 is a schematic sideview diagram illustrating the belt and coupling being reinstalled to the pulley wheel, which is supported and fixed to the aligned height by the platform portion of the support frame assembly in accordance with an exemplary embodiment of the invention.

FIG. 12 is a schematic sideview diagram illustrating the belt 120 and coupling 135 being reinstalled to the pulley wheel 125, which is supported and fixed to the aligned height by the platform portion 305 of the support frame assembly 300 in accordance with an exemplary embodiment of the invention. As illustrated in FIG. 12, with platform portion 305 stably supported via height fixing studs/nuts 340*a-b* against guiding pipes 310*a-c*, pulley wheel 125 can be fully reinstalled to air cooling assembly 100—by reinstalling belt 120 between drive wheel 117 and pulley wheel 125 (see upward arrow adjacent belt 120 in FIG. 12) and by reinstalling coupling 135 between pulley wheel 125 and drive shaft 130 (see upward arrow adjacent coupling 135 in FIG. 12)—while being held in alignment by support frame assembly 300.

Figure 13:
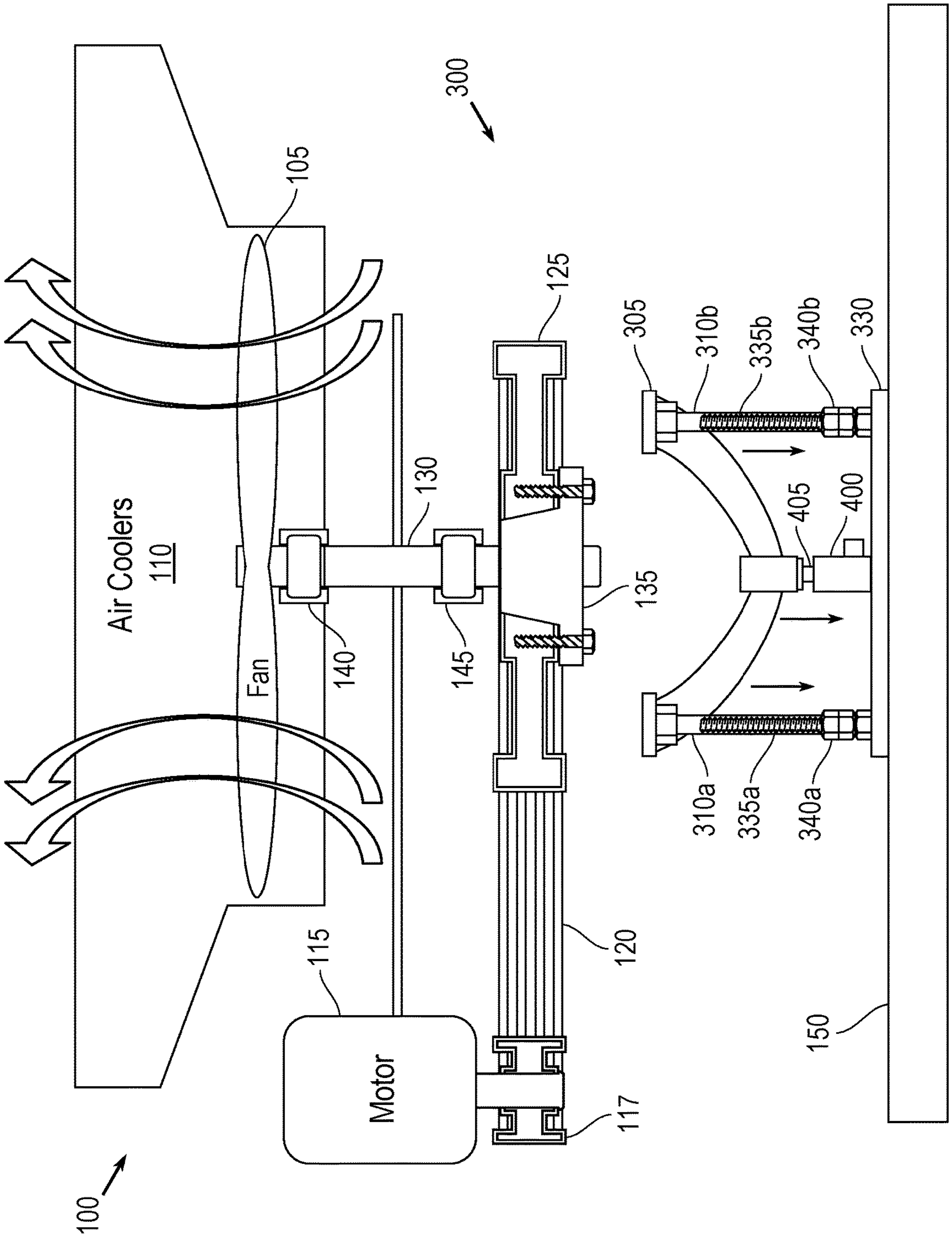
FIG. 13 is a schematic sideview diagram illustrating the return of the support frame assembly back to a default configuration after the pulley wheel is fully installed to the air cooling assembly according to an exemplary embodiment of the present invention.

Next, as illustrated in FIG. 13, studs/nuts 340*a-c* can be lowered back to the default configuration at the bottom portions of guide bars 335*a-c* (see downward arrows adjacent studs/nuts 340*a* and 340*b* in FIG. 13) and, thereafter, jack 400 can be released and disengaged to lower ram/saddle 405 (see downward arrow adjacent ram/saddle 405 in FIG. 13) to lower platform portion 305 away from pulley wheel 125. With support frame assembly 300 returned to its default configuration, it can be conveniently removed by, for example, using handles 345*a* and 345*b* shown in FIG. 3C.

As described above, platform portion 305 can be detached from base plate 330 by withdrawing guide bars 335*a-c* from guiding pipes 310*a-c*, thus further improving portability of support frame assembly 300.

While particular embodiments of the present invention have been shown and described in detail, it would be obvious to those skilled in the art that various modifications and improvements thereon may be made without departing from the spirit and scope of the invention. It is therefore intended to cover in the appended claims all such modifications and improvements that are within the scope of this invention.

What is claimed is:

1. A pulley wheel support frame, comprising:

a ring-shaped support rim having a top surface adapted to support a horizontal pulley wheel, said ring-shaped support rim being coupled, on a bottom side, to an opening adapted to receive a ram or a saddle of a jack;

a base; and three or more height-adjustable support columns coupling the base to the ring-shaped support rim, said height-adjustable support columns each being fixable at a plurality of different heights.

2. The pulley wheel support frame of claim 1, wherein a total height from a bottom of the base to the top surface of the ring-shaped support rim is below 1.5 feet in a default configuration of the three or more height-adjustable support columns.

3. The pulley wheel support frame of claim 1, wherein the three or more height-adjustable support columns are fixable to a raised configuration with a total height from a bottom of the base to the top surface of the ring-shaped support rim at or above 1.5 feet.

4. The pulley wheel support frame of claim 1, wherein the opening is embodied in a central housing that is coupled to the ring-shaped support rim by a plurality of frame legs.

5. The pulley wheel support frame of claim 4, wherein the plurality of frame legs and the three or more height-adjustable support columns are attached to the ring-shaped support rim on the bottom side in an alternating circular arrangement.

6. The pulley wheel support frame of claim 1, wherein the three or more height-adjustable support columns each comprise:

a guiding pipe extending from a bottom portion of the ring-shaped support rim;

a guide bar extending from a top portion of the base adapted for insertion into an internal channel at a bottom portion of the guiding pipe; and a stud coupled to the guide bar that abuts the bottom portion of the guiding pipe.

7. The pulley wheel support frame of claim 6, wherein the ring-shaped support rim is detachable from the base by withdrawing the guide bar from the internal channel of the guiding pipe in each of the three or more height-adjustable support columns.

8. The pulley wheel support frame of claim 6, wherein the stud is fixable to a plurality of different locations on the guide bar corresponding to the plurality of different heights.

9. The pulley wheel support frame of claim 8, wherein the stud and the guide bar are coupled to each other by complementary threads.

* * * * *